(12) United States Patent
Qiu

(10) Patent No.: US 12,479,386 B2
(45) Date of Patent: Nov. 25, 2025

(54) POWER SUPPLY OUTPUT APPARATUS, FAULT DIAGNOSIS METHOD, AIRBAG CONTROLLER AND AIRBAG SYSTEM

(71) Applicant: Robert Bosch GmbH, Stuttgart (DE)

(72) Inventor: Xiaofei Qiu, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 18/259,183

(22) PCT Filed: Nov. 11, 2021

(86) PCT No.: PCT/EP2021/081376
§ 371 (c)(1),
(2) Date: Jun. 23, 2023

(87) PCT Pub. No.: WO2022/144125
PCT Pub. Date: Jul. 7, 2022

(65) Prior Publication Data
US 2024/0067115 A1    Feb. 29, 2024

(30) Foreign Application Priority Data
Dec. 30, 2020 (CN) .......................... 202011605297.6

(51) Int. Cl.
*B60R 21/017*    (2006.01)
*B60R 21/01*    (2006.01)

(52) U.S. Cl.
CPC . *B60R 21/0173* (2013.01); *B60R 2021/01129* (2013.01)

(58) Field of Classification Search
CPC ............. B60R 21/0173; B60R 2021/01129
See application file for complete search history.

(56) References Cited

U.S. PATENT DOCUMENTS 5,101,192 A * 3/1992 Ishizuka ............. B60R 21/0173
340/436
7,890,232 B2 * 2/2011 Komaki ................ B60R 21/013
280/730.1
(Continued)

FOREIGN PATENT DOCUMENTS

CN        103582248 A  *  2/2014  .............. H02M 1/14
DE        200 05 783 U1    8/2001
(Continued)

OTHER PUBLICATIONS

International Search Report corresponding to PCT Application No. PCT/EP2021/081376, mailed Feb. 25, 2022 (English language document) (4 pages).

*Primary Examiner* — Gertrude Arthur Jeanglaude
(74) *Attorney, Agent, or Firm* — Maginot, Moore & Beck LLP

(57) ABSTRACT

A control circuit includes (i) at least one voltage output end, each said voltage output end being connected to a filter capacitor, (ii) at least one detection circuit disposed in the control circuit, each said detection circuit being connected to one said voltage output end, and (iii) a fault output apparatus which is configured to, when the detection circuit detects that a fault has occurred in the filter capacitor connected to the voltage output end, output corresponding filter capacitor fault indication information. The power supply output apparatus has no need for a redundant capacitor design, and can determine whether a fault has occurred in the filter capacitor on the basis of the duration of charging of the filter capacitor thus ensuring the reliability and stability of the power supply output apparatus.

8 Claims, 2 Drawing Sheets

(56) References Cited

U.S. PATENT DOCUMENTS

| | | | |
|---|---|---|---|
| 2005/0200202 A1* | 9/2005 | Mihara | B60L 1/00 307/10.1 |
| 2010/0177538 A1 | 7/2010 | Scherr | |
| 2011/0031812 A1* | 2/2011 | Morimoto | B60L 3/12 307/77 |
| 2013/0106174 A1* | 5/2013 | Uchida | H01M 10/46 307/9.1 |

FOREIGN PATENT DOCUMENTS

| | | |
|---|---|---|
| JP | H7-47914 A | 2/1995 |
| JP | 2004-274935 A | 9/2004 |
| JP | 2005-170125 A | 6/2005 |
| JP | 2009-241764 A | 10/2009 |
| JP | 2015-503479 A | 2/2015 |
| JP | 2015-505779 A | 2/2015 |
| JP | 6338791 B1 | 6/2018 |
| WO | 2004/096613 A1 | 11/2004 |
| WO | 2019/038873 A1 | 2/2019 |

\* cited by examiner

POWER SUPPLY OUTPUT APPARATUS, FAULT DIAGNOSIS METHOD, AIRBAG CONTROLLER AND AIRBAG SYSTEM

This application is a 35 U.S.C. § 371 National Stage Application of PCT/EP2021/081376, filed on Nov. 11, 2021, which claims the benefit of priority to Serial No. CN 2020 1160 5297.6, filed on Dec. 30, 2020 in China, the disclosures of which are incorporated herein by reference in their entirety.

The present disclosure relates to power supply output technology, in particular to a power supply output apparatus and a fault diagnosis method; the present disclosure further relates to an airbag controller and an airbag system.

BACKGROUND

In the design of an electronic control unit for a vehicle airbag (Air Bag Electronic Control Unit), a number of capacitors are generally provided at an output end of a power supply for the purpose of filtering noise in the power supply and maintaining the stability of the power supply output. Furthermore, from the perspective of Design Failure Mode and Effects Analysis (DFMEA), it is also necessary to provide a redundant capacitor at the power supply output end. However, the provision of a redundant capacitance increases the volume of the power supply output control circuit as a whole, and also results in the electronic control unit having a high cost. In addition, with the existing manner of providing redundant capacitance, when a capacitor develops a fault, detection thereof is not possible.

SUMMARY

An object of the present disclosure is to overcome the abovementioned shortcomings, and solve the problems of structural complexity, high cost and inability to detect whether a capacitor has a fault, which are caused by the provision of a redundant capacitor at the control unit power supply output end in the prior art. The present disclosure is realized through the following solution:
  a power supply output apparatus, comprising:
  a control circuit, having at least one voltage output end; each said voltage output end being connected to a filter capacitor;
  at least one detection circuit, disposed in the control circuit, each said detection circuit being connected to one said voltage output end;
  a fault output apparatus which, when the detection circuit detects that a fault has occurred in the filter capacitor connected to the voltage output end, outputs corresponding filter capacitor fault indication information. Furthermore, each said voltage output end is respectively connected to one filter capacitor.

The present disclosure further provides a fault diagnosis method based on the power supply output apparatus as described above, comprising: after the control circuit is powered on, each said voltage detection circuit respectively detecting an operating state of the filter capacitor connected to the voltage output end connected to said voltage detection circuit; when the operating state of the filter capacitor meets a preset condition, the control circuit judging that a fault has occurred in the filter capacitor and outputting corresponding filter capacitor fault indication information via the fault output apparatus.

The invention disclosure further provides an airbag controller, having the power supply output apparatus as described in any one of the items above, the power supply output apparatus supplying an operating voltage to the airbag controller.

The present disclosure further comprises an airbag system, comprising an airbag, a gas generator, a sensor and the airbag controller as described above, the airbag controller being electrically connected to the sensor and the gas generator separately, and the gas generator being connected to the airbag; upon detecting a collision event, the sensor sends an airbag inflation instruction to the airbag controller; in response to the inflation instruction, the airbag controller sends an inflation activation instruction to the gas generator and supplies an operating voltage to the gas generator; and in response to the inflation activation instruction, the gas generator inflates the airbag.

In the power supply output apparatus and fault diagnosis method in the solution of the present disclosure, by providing a filter capacitor on each voltage output end, noise filtering at the power supply output end is achieved, so that the output power supply is more stable. At the same time, with the voltage detection circuit provided in the control circuit, it is possible to judge whether a fault has occurred in the filter capacitor on the basis of the duration of charging of the filter capacitor, and corresponding indication information such as alarm information can be outputted, to indicate that the corresponding faulty filter capacitor should be replaced, thus ensuring the reliability and stability of the power supply output apparatus, making the airbag electronic control unit more reliable, and ensuring a stable power supply for the airbag. Only one filter capacitor is provided at the power supply output end in the solution of the present disclosure, with no need to provide a redundant capacitor, so costs are reduced. Moreover, because there is no need to provide a redundant capacitor, the power supply output apparatus has a smaller overall volume, thus reducing the volume of an application specific integrated circuit of the airbag electronic control unit.

BRIEF DESCRIPTION OF THE DRAWINGS

The features, characteristics, advantages and benefits of the present disclosure will become obvious through the following detailed description in conjunction with the drawings.

DETAILED DESCRIPTION

The technical solution in embodiments of the present disclosure is described in detail below in conjunction with FIGS. 1 and 2.

Figure 1:
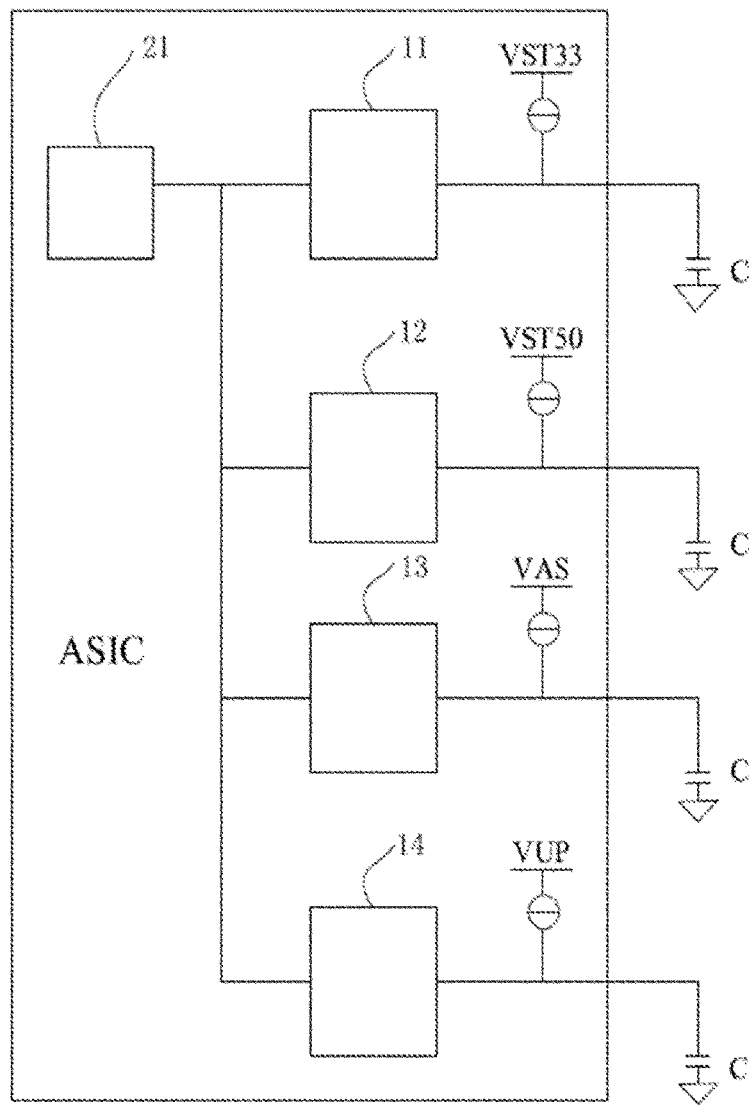
FIG. 1 is a schematic diagram of the composition and structure of a power supply output apparatus in an embodiment of the present disclosure.

FIG. 1 is a schematic diagram of the composition and structure of a power supply output apparatus in an embodiment of the present disclosure; the power supply output apparatus is used in an airbag controller, and for example may be connected to an ASIC (Application Specific Integrated Circuit) in the airbag controller. As shown in FIG. 1, the power supply output apparatus comprises: a control circuit, a detection circuit and a fault output apparatus (not shown in the figure), wherein the control circuit has at least one voltage output end; each voltage output end is separately connected to a filter capacitor. The detection circuit comprises a first voltage detection sub-circuit 11, a second voltage detection sub-circuit 12, a third voltage detection sub-circuit 13 and a fourth voltage detection sub-circuit 14, as shown in FIG. 1. The detection circuit is configured to detect whether a fault, such as a capacitor open circuit, breakdown or electric leakage, has occurred in the filter capacitor connected to the voltage output end; and upon detecting that a fault has occurred in the filter capacitor, output corresponding filter capacitor fault indication information via the fault output apparatus. Four voltage output ends are shown in the figure: VST33, VST50, VAS and VUP voltage output ends, which respectively supply different operating voltages to corresponding control circuits so that the airbag controller operates normally. Here, the VST33, VST50, VAS and VUP voltage output ends respectively provide switch-in for the associated control circuits of the airbag controller by means of pins or ports, in order to supply operating voltages to the associated control circuits.

It must be explained that the circuit structure shown in FIG. 1 is merely the specific example of this embodiment; this embodiment can provide one or more voltage output end, can provide any number of voltage output ends within the limits of ASIC capability according to the operating voltages needed by the associated control circuits, and can provide any operating voltage, e.g. can provide an operating voltage of 33 V, 24 V, 6.7 V, 5 V, 3.3 V or 1.25 V, etc. Those skilled in the art will understand that when the voltage output ends required exceed the number of available output pins or ports of the ASIC, this can be achieved by providing multiple ASICs.

Continuing to refer to FIG. 1, at each voltage output end of the ASIC, each voltage output end is respectively connected to a filter capacitor, with no need to additionally provide a redundant filter capacitor; the filter capacitor is configured to filter nose in the power supply and can be charged by the voltage output end to the operating voltage thereof and thereby maintain the stability of the power supply output. The filter capacitor has one end connected to the voltage output end of the control circuit, and another end connected to ground. In addition, in this embodiment, a corresponding voltage detection circuit is provided in the ASIC to detect the duration of charging of the filter capacitor, for the purpose of judging whether a fault has occurred in the filter capacitor, so as to guarantee the operating state of the filter capacitor. Furthermore, at least one voltage detection circuit is provided in the control circuit, each voltage detection circuit being respectively connected on a line between each voltage output end and the filter capacitor of the voltage output end. As shown in FIG. 1, when the number of voltage output ends is greater than or equal to 2, after connecting in series each voltage output end and each voltage detection sub-circuit respectively, each voltage detection sub-circuit is connected to a reset switch 21 in the control circuit. After the control circuit is powered on, the voltage detection circuit respectively detects the duration of charging, to the operating voltage, of a voltage between each voltage output end and the filter capacitor, and when the control circuit detects that the duration of charging of the filter capacitor is less than a preset threshold, the control circuit judges that the filter capacitor has a fault and outputs indication information via the fault output apparatus. Here, the indication information can provide an indication by means of a signal indicator lamp lighting up, going out or flashing, etc.; for example, when it is detected that the duration of charging of the filter capacitor is less than a normal duration of charging, a filter capacitor fault is indicated by means of the indicator lamp being continuously lit or flashing; it is also possible to output textual indication information, to indicate the filter capacitor fault. In addition, the preset threshold is specifically set according to a theoretical value for filling of charge in the filter capacitor, e.g. can be set to the theoretical value, or to an empirical value slightly greater than or slightly less than the theoretical value.

Those skilled in the art will understand that as shown in FIG. 1, in this embodiment, when the number of voltage output ends is greater than or equal to 2, one corresponding voltage detection circuit is provided for each voltage output end, in order to detect the operating state of the filter capacitor on each voltage output end, so as to determine whether the filter capacitor has a fault. However, the present disclosure is not limited to this; in other embodiments, it is possible for only one voltage detection circuit to be provided, this voltage detection circuit being configured to detect the duration of charging of the filter capacitor of each voltage output end in the control circuit, and respectively perform a comparison with a normal duration of charging of the filter capacitor of each voltage output end; when it is determined that the duration of charging of the filter capacitor is less than the normal duration of charging of the capacitor, it is judged that the filter capacitor has a fault.

Figure 2:
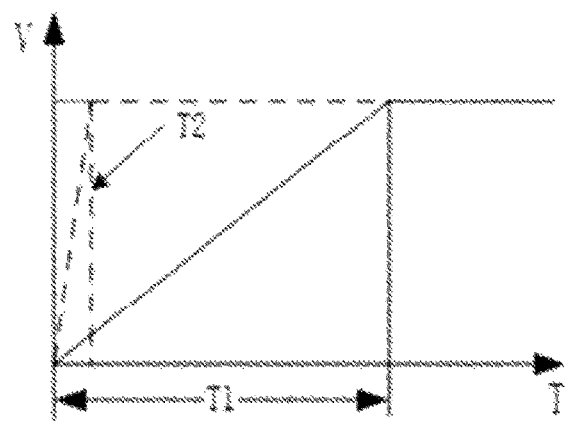
FIG. 2 is a schematic diagram illustrating the principle of filter capacitor voltage detection in an embodiment of the present disclosure.

FIG. 2 is a schematic diagram illustrating the principle of filter capacitor voltage detection in this embodiment; as shown in FIG. 2, in this embodiment, the horizontal axis is the charging time T, and the vertical axis is the charging voltage V. After the control circuit is powered on, each voltage output end is powered on and charges the filter capacitor, such that a voltage on a line of each voltage output end is pulled down; when charging of the filter capacitor is complete, the voltage on the line of each voltage output end reaches a corresponding operating output voltage. That is to say, when the filter capacitor has not developed a fault, it will require the normal duration of charging T1 shown in FIG. 2 in order to complete charging. If the filter capacitor has developed a fault or no filter capacitor is provided, then after the control circuit is powered on, the voltage on the line of each voltage output end will reach the operating output voltage very quickly, and the duration of charging T2 of the filter capacitor will be less than the normal duration of charging T1.

In this embodiment, due to the fact that the filter capacitor is charged after the control circuit is powered on, it is also possible for a corresponding operating voltage to be supplied to a corresponding operating circuit such as an airbag electronic control unit by means of the filter capacitor when the control circuit experiences a power failure, ensuring that an airbag installed in a vehicle for example can still be caused to open as expected after the control circuit experiences a power failure, and thus ensuring the safety of the driver of the vehicle. When the control circuit determines that each duration of charging is less than the corresponding set threshold, corresponding filter capacitor fault indication information is outputted.

In this embodiment, the filter capacitor may be a Multilayer Ceramic Capacitor (MLCC).

In this embodiment, after the control circuit is powered on, each of the voltage output ends will respectively output a corresponding operating voltage when charging of the filter capacitor is complete. The operating voltage comprises at least one of the following: 33 V, 24 V, 6.7 V, 5 V, 3.3 V and 1.25 V.

In this embodiment, the power supply output apparatus of the control circuit may be arranged in an ASIC, and an operating voltage is supplied to a gas generator and a corresponding sensor in the airbag controller by means of the power supply output apparatus in the ASIC. In this embodiment, as one manner of implementation, the ASIC may also be replaced by a Field Programmable Gate Array (FPGA), a Programmable Logic Device (PLD) or a Complex Programmable Logic Device (CPLD), etc.

Figure 3:
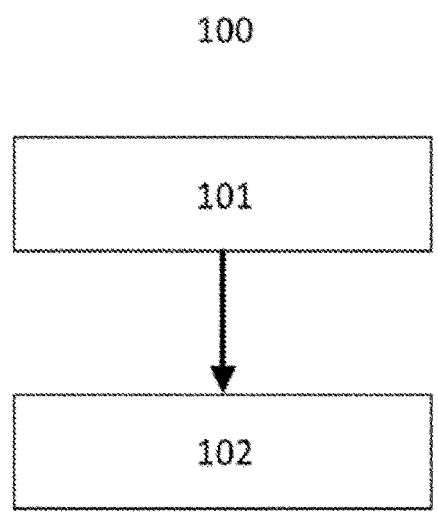
FIG. 3 is a flow chart of a fault diagnosis method in an embodiment of the present disclosure.

FIG. 3 shows a flow chart of a fault diagnosis method according to an embodiment of the present disclosure; the fault diagnosis method 100 is performed by the power supply output apparatus in the above embodiment for example. As shown in the figure, the fault diagnosis method 100 comprises:

Step 101: after a control circuit is powered on, each voltage detection circuit respectively detects an operating state of a filter capacitor connected to each voltage output end, for example: each voltage detection circuit respectively detects a duration of charging when a voltage between each voltage output end and the filter capacitor charges the filter capacitor to an operating voltage thereof;

Step 102: when the operating state of the filter capacitor meets a preset condition, e.g. when the duration of charging of the filter capacitor is less than a preset threshold, the control circuit judges that a fault has occurred in the filter capacitor and outputs corresponding filter capacitor fault indication information via a fault alarm apparatus.

The present disclosure further discloses an airbag controller, having the power supply output apparatus of the above embodiment provided in the airbag controller, wherein the power supply output apparatus supplies an operating voltage to an airbag control component.

The present disclosure further discloses an airbag control system, comprising an airbag, a gas generator, a sensor and the airbag controller of the above embodiment; an adaptive capacitor charging circuit of the above embodiment is provided in the airbag controller, the sensor is electrically connected to the airbag controller, the gas generator is electrically connected to the airbag controller, and the gas generator is connected to the airbag. Upon detecting an event, the sensor sends an airbag inflation instruction to the airbag controller; in response to the inflation instruction, the airbag controller sends an inflation activation instruction to the gas generator and supplies an operating voltage to the gas generator; and in response to the inflation activation instruction, the gas generator inflates the airbag. The event detected by the sensor comprises a collision event; the sensor is for example one or more of an eccentric hammer sensor, a rolling ball collision sensor, a roller collision sensor, a mercury switch collision sensor, a piezoresistive effect collision sensor and a piezoelectric effect collision sensor. For example, when the collision sensor detects that a value reflecting a physical quantity exceeds a certain threshold, it is determined that a collision event has occurred.

In the solution of the present disclosure, by providing a filter capacitor on each voltage output end, noise filtering at the power supply output end is achieved, so that the output power supply is more stable. With the voltage detection circuit provided in the control circuit, it is possible to determine whether a fault has occurred in the filter capacitor on the basis of the duration of charging of the filter capacitor, and corresponding indication information such as alarm information can be outputted, to indicate that the corresponding faulty filter capacitor should be replaced, thus ensuring the reliability and stability of the power supply output apparatus in embodiments of the present application, making the airbag controller more reliable, and ensuring a stable power supply for the airbag. Only one filter capacitor is provided at the power supply output end in embodiments of the present application, with no need to provide a redundant capacitor, so costs are reduced; because there is no need to provide a redundant capacitor, the power supply output apparatus in embodiments of the present application has a smaller overall volume, so can be placed in an airbag electronic control unit more easily.

The various functional units in embodiments of the present disclosure may all be integrated in one processing unit, or each unit may separately serve as one unit, or two or more units may be integrated in one unit; the abovementioned integrated units may be implemented in the form of hardware, or in the form of hardware-plus-software functional units.

Those skilled in the art could still amend or replace various details without deviating from the substance and scope of the present disclosure. The scope of protection of the present disclosure is defined only by the claims.

The invention claimed is:

1. A power supply output apparatus, comprising:
    a control circuit having at least one voltage output end connected to a filter capacitor;
    at least one detection circuit disposed in the control circuit and connected to the at least one voltage output end; and
    a fault output apparatus configured to, when the at least one detection circuit detects that a fault has occurred in the filter capacitor, output filter capacitor fault indication information,
    wherein after the control circuit is powered on, the at least one detection circuit detects a voltage of the at least one voltage output end, and
    wherein, during a duration of charging of the filter capacitor, when a voltage of the filter capacitor is less than a preset threshold, the fault output apparatus is configured to output the filter capacitor fault indication information.

2. The power supply output apparatus according to claim 1, wherein;
    the at least one voltage output end is included in a plurality of voltage output ends,
    the filter capacitor is included in a plurality of filter capacitors,
    each of the voltage output ends of the plurality of voltage output ends is respectively connected to only one filter capacitor of the plurality of filter capacitors.

3. The power supply output apparatus according to claim 1, wherein:
    the at least one voltage output end is included in a plurality of voltage output ends,
    after the control circuit is powered on, each voltage output end of the plurality of voltage output ends respectively outputs a different operating voltage of a plurality of operating voltages.

4. The power supply output apparatus according to claim 2, wherein the plurality of operating voltages comprises at least two of: 33 V, 24 V, 6.7 V, 5 V, 3.3 V, and 1.25 V.

5. The power supply output apparatus according to claim 1, wherein:
    the at least one detection circuit is included in a plurality of detection circuits,
    the plurality of detection circuits is connected to a reset switch in the control circuit.

6. A fault diagnosis method based on the power supply output apparatus according to claim 1, wherein:
  after the control circuit is powered on, the at least one voltage detection circuit detects an operating state of the filter capacitor; and
  when the operating state of the filter capacitor meets a preset condition, the control circuit determines that the fault has occurred in the filter capacitor and the fault output apparatus outputs the filter capacitor fault indication information.

7. An airbag controller, comprising:
  the power supply output apparatus according to claim 1,
  wherein the power supply output apparatus is configured to supply an operating voltage to the airbag controller.

8. An airbag system, comprising:
  an airbag;
  a gas generator;
  a sensor; and
  the airbag controller according to claim 7,
  wherein the airbag controller is electrically connected to the sensor and the gas generator separately,
  wherein the gas generator is connected to the airbag,
  wherein the sensor is configured to, upon detecting a collision event, send an airbag inflation instruction to the airbag controller,
  wherein the airbag controller is configured to, in response to the inflation instruction, send an inflation activation instruction to the gas generator and supply an operating voltage to the gas generator; and
  wherein the gas generator is configured, in response to the inflation activation instruction, inflate the airbag.

* * * * *